United States Patent [19]
Hu et al.

[11] Patent Number: 6,104,510
[45] Date of Patent: Aug. 15, 2000

[54] HYBRID ILLUMINATION SYSTEM FOR ACCELERATING LIGHT INTEGRATION IN IMAGE SENSING SYSTEMS

[75] Inventors: Darwin Hu; Alpha Hou, both of San Jose, Calif.

[73] Assignee: Syscan, Inc., San Jose, Calif.

[21] Appl. No.: 09/100,740

[22] Filed: Jun. 19, 1998

[51] Int. Cl.$^7$ ...................................................... H04N 1/46
[52] U.S. Cl. ........................................... 358/509; 358/505
[58] Field of Search .................................... 358/509, 475, 358/505, 513, 514, 473, 506, 487; 250/559.05, 208.1, 234, 235, 236; 355/32, 37, 67, 70; 399/220; 382/312, 313

[56] References Cited

U.S. PATENT DOCUMENTS

| | | | |
|---|---|---|---|
| 4,812,900 | 3/1989 | Kadowaki et al. | 358/509 |
| 4,930,008 | 5/1990 | Suzuki et al. | 358/509 |

*Primary Examiner*—Cheukfan Lee
*Attorney, Agent, or Firm*—Joe Zheng

[57] ABSTRACT

The present invention has particular applications to scanners such as desktop and sheet-fed scanners. To keep the scanner cost down while increasing the overall system performance, the present invention discloses an improved scanning mechanism that uses a single image sensor and a hybrid light source comprising at least one colored LED and at least one colored cold cathode fluorescent lamp. According to one embodiment, the hybrid light source uses a blue cold cathode fluorescent lamp and a red LED and a green LED. Three color signals are respectively generated under three different illuminations, namely the blue cold cathode fluorescent lamp alone, the red LED together with the blue cold cathode fluorescent lamp and the green LED together with the blue cold cathode fluorescent lamp. With the strong intensity provided by the blue cold cathode fluorescent lamp, the light integration process intervals are significantly reduced as such the overall system performance of scanning systems is greatly improved.

13 Claims, 5 Drawing Sheets

HYBRID ILLUMINATION SYSTEM FOR ACCELERATING LIGHT INTEGRATION IN IMAGE SENSING SYSTEMS

BACKGROUND OF THE INVENTION

1. Field of the Invention

The present invention generally relates to color scanning systems and more particularly relates to a hybrid illumination system comprising at least a high intensity color-biased light source so as to decrease the exposure time to sensors to increase overall system performance.

2. Description of the Related Art

There are many applications that need optical scanners to convert paper-based objects, such as texts and graphics, to an electronic format that can be subsequently analyzed, distributed and archived. One of the most popular optical scanners is flatbed scanners that convert objects, including pictures and papers, to images that can be used, for example, for building Web pages and optical character recognition. Another emerging optical scanner is what is called sheet-fed scanners that are small and unobtrusive enough to sit between a keyboard and a computer monitor or integrated into a keyboard to provide a handy scanning means. Most optical scanners are referred to as image scanners as the output thereof is generally in digital format.

An image scanner generally includes a sensing module that converts scanning objects optically into electronic images. The sensing module comprises an illumination system, an optical system, an image sensor and an output circuit. The illumination system is used to illuminate an object that is being scanned. The optical system is used to direct and focus the light reflected from the scanning object onto the image sensor. The image sensor comprises a plurality of photodiodes or photocapacitors, referred to as photo-detector hereafter, that are sensitive to light and produce proportional pixel signals accordingly. Therefore corresponding pixel signals are produced in the image sensor when the reflected light is focused thereon and the output circuit is used to convert the pixel signals to an appropriate format to be processed or stored in subsequent systems.

The image sensor is generally in the form of Complementary Metal-Oxide Semiconductor (CMOS) or Charged Couple Device (CCD) and fabricated in either a one-dimensional array or two-dimensional array. The operation of the image sensor often comprises two processes, the first being the light integration process and the second being the readout process. In the light integration process, each photo-detector captures the incident photons of the reflected light and records the total amount of these photons as a charge or pixel signal. After the light integration process the photo-detector is masked so that no further photons are captured and meanwhile the photo-detectors start the readout process during which the pixel signal stored in each photo-detector is individually readout, via a readout passage, to a data bus or video bus.

Many flatbed and sheet-fed scanners use one-dimensional image sensor. This requires either the image sensor or the scanning object to move against each other so as to get the scanning object completely scanned. When the scanners are capable of reproducing colors, there are generally three distinct color components to be generated from the scanning object. Depending on the illumination techniques used and the way the scanning object is scanned, there are several scanning mechanisms that may be found in conventional scanners in the market.

In the first scanning mechanism, the scanner employs an illumination system that comprises multiple light sources, for example, three Light Emitting Diodes (LED), each corresponding to one of three different colors red (R), green (G) and blue (B). The image sensor is normally a single monochrome linear array of photo-detectors. In order to reproduce colors from a scanning object, each line of the object has to be scanned three times. Each time only one LED is turned on. This configuration has several disadvantages. The most noticeable one is the low speed performance because each line of the scanning object has to be scanned three times in sequential order with respect to each turned on LED. The second disadvantage is the uneven light intensity of the light sources. Generally, the intensity of the blue LED is weaker than that of the green LED, and then the light integration period of the blue color needs to be longer than that of the green color. Otherwise the reproduced color in the scanned image may be biased towards green. To improve the scanning speed, the typical practice is to increase the power of each LED so that the light integration period for scanning each color is reduced. However, it is generally expensive to make the high power blue LED.

In the second scanning mechanism, the scanner employs an illumination system that comprises a single light source with white color, typically, a cold cathode fluorescent lamp producing white color. The image sensor is a tri-linear RGB sensor array that can be viewed as a combined three linear arrays of photo-detectors in parallel, each linear array coated with a red filter, a green filter, or a blue filter, respectively. When scanning an object, the illumination system casts the white light that is then reflected, directed and focused on the image sensor. The three linear sensor arrays integrate the light simultaneously and respectively. Because each linear array is coated with a color filter, the image formed with one linear array forms the corresponding color component of the color image. This configuration improves the scanning speed at least three times faster than that in the first configuration, because three color components of a scanning line are formed simultaneously.

This configuration also has several disadvantages. The most noticeable disadvantage is that the cost of the tri-linear RGB sensor array. The manufacturing cost of the tri-linear RGB sensor array can be several magnitudes of that of the single monochrome linear array. Further, it is difficult to align multiple tri-linear RGB sensor arrays for a large width of a scanning object.

Thus there is a great need for a scanning mechanism that provides a generic solution to increase overall performance of a scanning system while not incurring additional cost.

SUMMARY OF THE INVENTION

The present invention has been made in consideration of the above described problems and needs and has particular applications to scanners such as desktop and sheet-fed scanners. To keep the scanner cost down while increasing the overall system performance, the present invention discloses an improved scanning mechanism that uses a single image sensor and a hybrid illumination system comprising at least one colored regular light source, such as a LED and at least one color-biased high intensity light source, such as a blue cold cathode fluorescent lamp.

According to one embodiment of the present invention, the improved scanning mechanism for accelerating the light integration process in image sensing systems, the scanning mechanism comprises:

a hybrid illumination system comprising a high intensity colored light source, a first colored light source and a second colored light source;

an image sensor producing a high intensity image of a scanning object illuminated only by the high intensity colored light source;

a memory buffering the high intensity image;

the image sensor producing a first image of the scanning object when the scanning object is illuminated by both of the high intensity colored light source and the first colored light source; and the image sensor futher producing a second image of the scanning object when the scanning object is illuminated by both of the high intensity colored light source and the second colored light source;

wherein the high intensity colored light source can be a cold cathode fluorescent blue lamp, the first colored light source can be a red LED and the second colored light source can be a green LED, as such lights from the three different light sources form a tricolor capable of reproducing all colors.

The scanning mechanism further comprises:

a circuitry producing a color image of the scanning object, the color image comprising the high intensity image, a first resulting image and a second resulting image, wherein the first resulting image is produced from the high intensity image in the memory with the first and the second resulting image is produced from the high intensity image in the memory with the second image.

One important aspect of the present invention, which is distinctly differentiated from existing illumination techniques in scanners, is that, instead of switching the three lights on and off, the high intensity colored light source is kept on all the time, even the other two colored light source, e.g. LEDs, are respectively on. The light integration process for the illumination of the high intensity colored light source is evidently improved, the processes for corresponding LEDs along with the "ON" high intensity colored light source are significantly enhanced as well. Further, the images generated from the illumination of the high intensity colored light source alone, or the mixed LED and the high intensity colored light source are not the traditional outputs from a sensing module observed in existing scanners in markets.

Accordingly, an important object of the present invention is to provide a generic solution for improving light integration process in sensing module so as to increase overall system performance of scanners without incurring additional costs.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
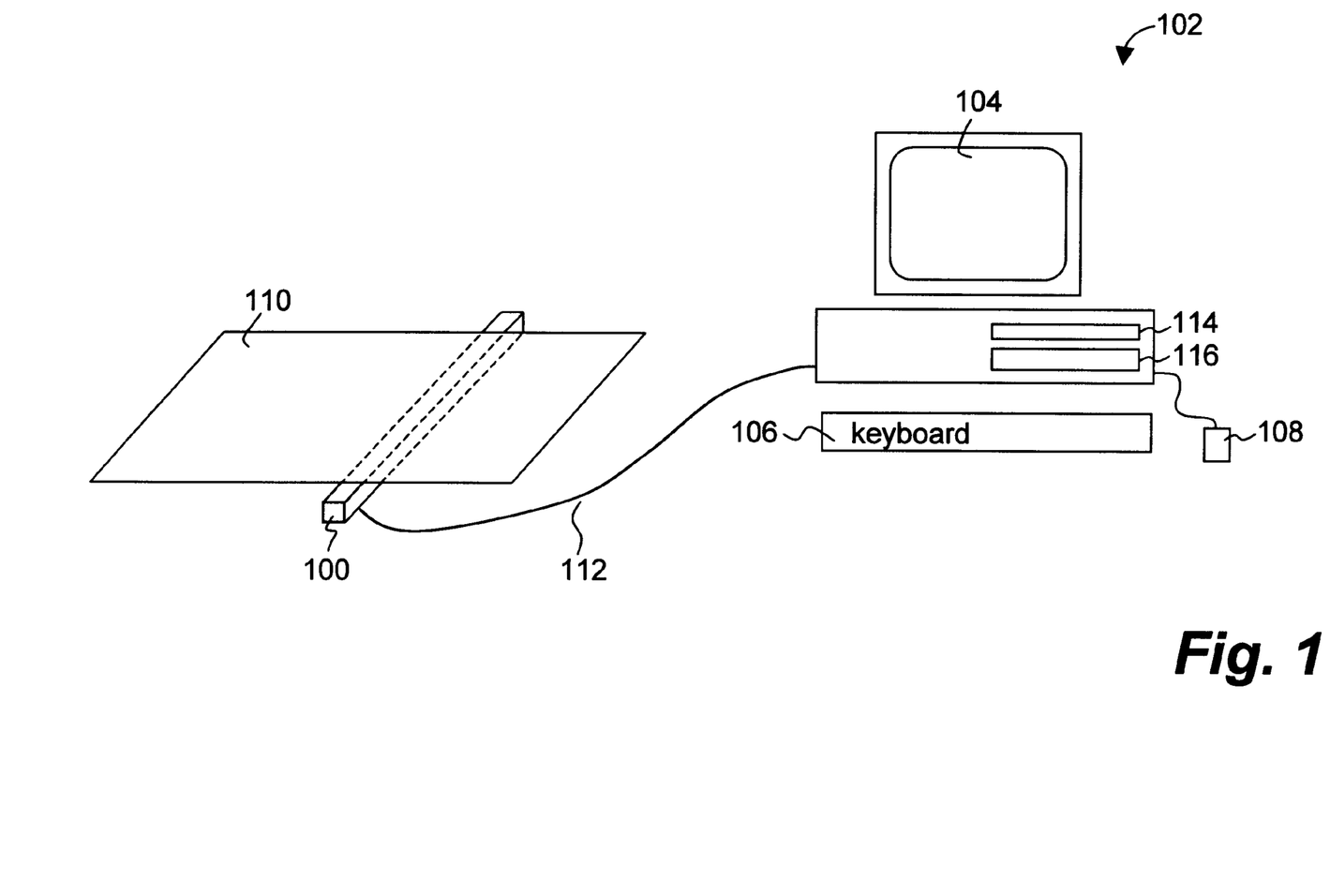
FIG. 1 depicts a schematic diagram showing a scanner application.

Referring now to the drawings, in which like numerals refer to like parts throughout the several views. FIG. 1 shows a schematic diagram embodying a scanner application. Scanner 100 is connected, through communication cable 112, to computing device 102 which may be an IBM PC or PC-compatible computer operating under a window operating system, for example, Microsoft Window 98.

Scanner 100 scans a scanning object 110, such as a paper with text and graphics on it. The scanning result, which is generally a digital image, is transferred to computer 102 through communication cable 112. The image may be manipulated for desired visual effects by a computer program. The scanned image or manipulated image can be displayed on display monitor 104.

Computing device 102 is provided with a display monitor 104 on which the scanned image or manipulated image can be displayed to users. Computing device 102 is further provided with a floppy disk drive 114 with which removable floppy disk media may be read or written, fixed disk drive 116 for storing image files and application program files, a keyboard 106 for permitting input of text data, such as titles and names for scanned image files, and a pointing device 108 such as a mouse or the like which is also provided to permit execution of commands, for example, to display the scanned and manipulated images on display monitor 104.

Figure 2:
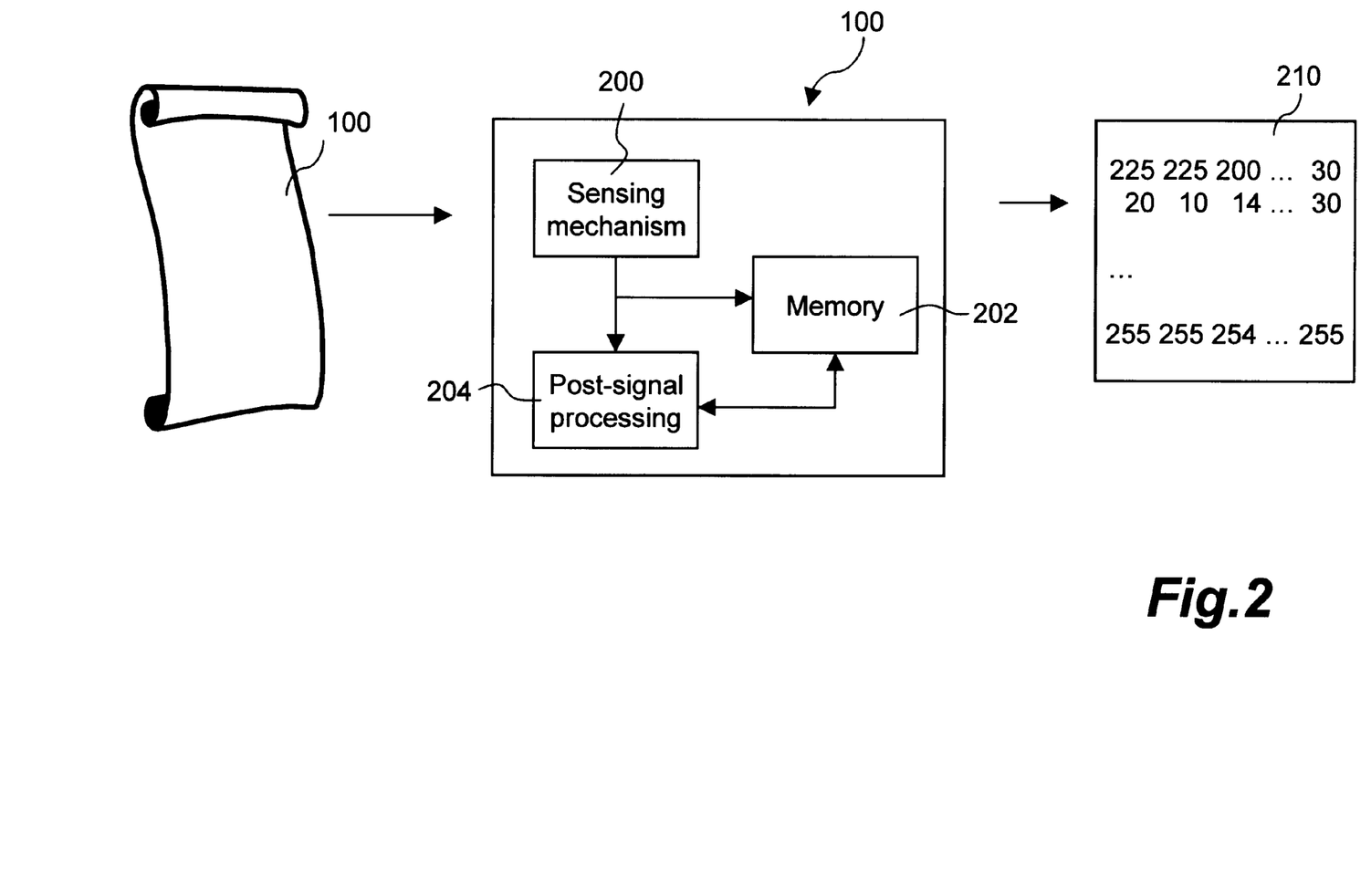
FIG. 2 illustrates a configuration in which the present invention may be practiced.

FIG. 2 shows a systemic diagram of a configuration in which the present invention may be practiced. Scanner 100 converts a paper-based scanning object 110 to a corresponding image 210. In the case of a monochrome scan, image 210 comprises a plurality of pixels, each pixel represented by a numerical value representing the intensity of the light reflectance falling on a sensor in scanner 100 from a corresponding dot in scanning object 110. For example, the paper-based scanning object 110 is an 8.5 inch by 11 inch paper; the resultant image 210 has a size 850 by 1100 pixels and is in 8-bit format. This means that each square inch of scanning object 110 is represented by 100 by 100 pixels. If all the pixels in the square inch are 255, the corresponding square inch in scanning object 110 is white. Conversely if all the pixels in the square inch are 0, the corresponding square inch in scanning object 110 is dark. It can be understood that any pixels having a value between 0 and 255, i.e. the gray scale, represent the variations of contents in scanning object 110. When scanner 100 is capable of reproducing colors, image 210 comprises three individual gray scale images, each generally representing red, green and blue intensity. In other words, each dot in scanning object 110 is represented by a three-intensity-value vector, such as [23, 45, 129].

Scanner 100 comprises a sensing module 200, a memory 202, and a post signal-processing module 204. The present invention is preferably embodied in sensing module 200, therefore other hardware or processes in scanner 100 are not to be described in detail to avoid unnecessarily obscuring aspects of the present invention.

Figure 3A:
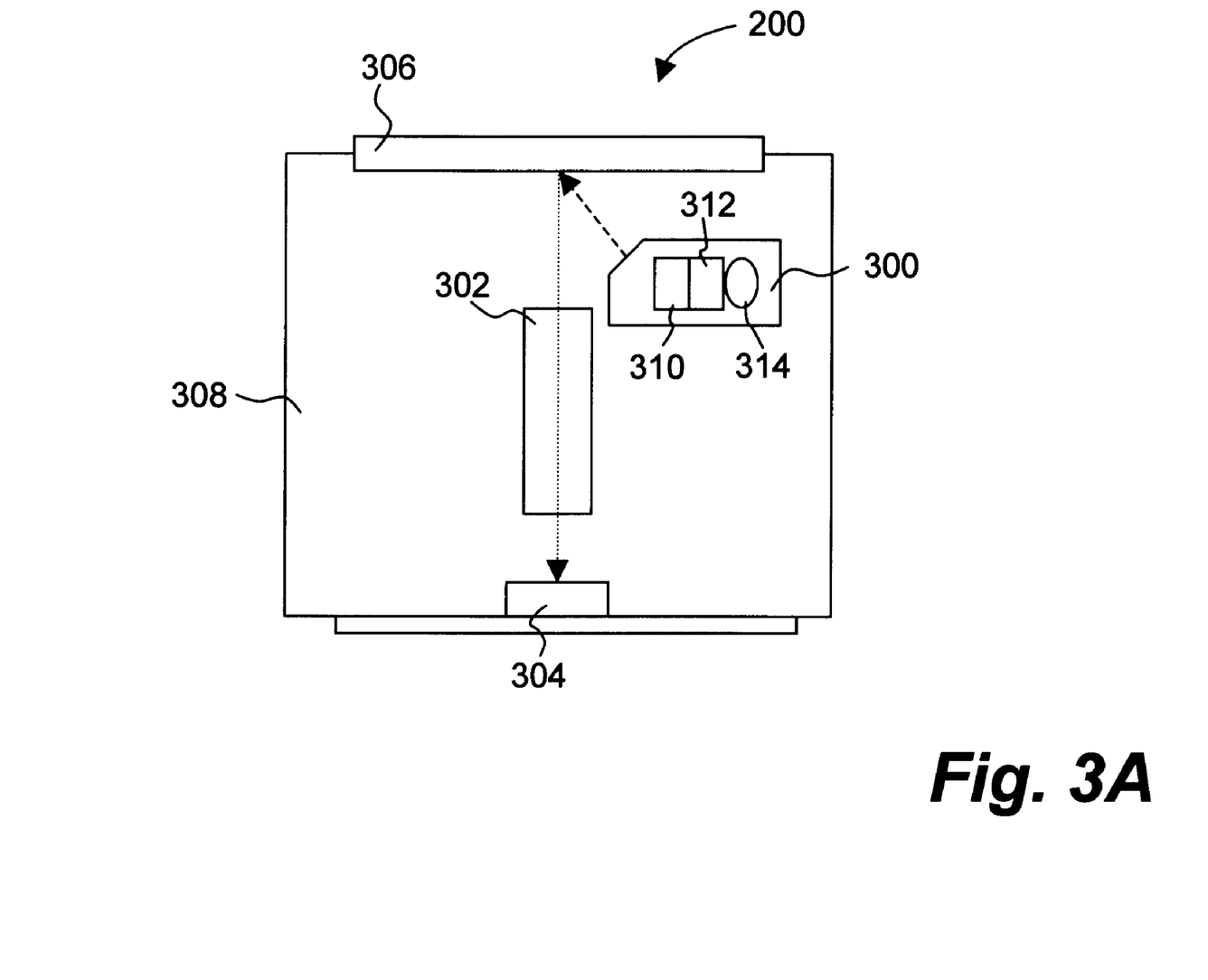
FIG. 3A illustrates a side view of a sensing module employing a hybrid illumination system (or light source) according to one embodiment of the present invention.

FIG. 3A is a side view of a sensing module 200. As shown in this figure, sensing module 200 comprises an illumination system (hybrid light source 300), an optical system 302, an image sensor 304, a cover glass 306. Case 308 is provided to integrate all the components in an enclosed compartment. Illumination system 300 provides light sources of three different colors, such as red, green and blue. Apart from illumination systems in conventional scanners, illumination system 300 disclosed herein is a hybrid light source comprising at least one high intensity lamp, such as a cold cathode fluorescent lamp and at lease a regularly used light source, such as LED (light emitting diode).

According to one embodiment of the present invention, illumination system 300 uses a red LED 310, a green LED 312, and a blue cold cathode fluorescent lamp 314. Scanning object, not shown in the figure, may be a sheet of paper placed face down on cover glass 306 such that the scanning side is illuminated by hybrid light source 300. Cover glass 306 is transparent and provides a focus means for the paper to be properly scanned. When hybrid light source 300 emits light onto the paper, the light reflected from the paper through cover glass 306 is directed at optical system 302. Optical system 302 is generally an array of one-to-one erect graded index micro (cylindrical or rod) lens. It should be understood that the present invention is independent of the optical lens. The cylindrical lens used herein is just to show one example using the present invention.

For the paper over cover glass 306 to be completely scanned, the paper and image sensing module 200 has to move against each other. In a flatbed scanner, the paper is held still while sensing module 200 is driven to move along the paper at a fixed speed. In a sheet-fed scanner, image-sensing module 200 is held still and the paper is rolled along sensing module 200 at a fixed speed. In both cases, the motion is performed by a moving mechanism that is not shown in the figure. The moving speed determines the vertical scanning resolution. When a line of the paper is being scanned, the paper on cover glass 306 is kept still. After one line is scanned, generally three times respectively for three different color lights, the paper is advanced one scan line by the moving mechanism. The moving distance depends on the vertical resolution of the scanning process.

Under optical system 302, there is an image sensor 304 comprising an array of photo-detectors made of CMOS, CCD or other sensors. The array is normally configured as one-dimensional array, often referred to as a linear sensor. It will be appreciated by those skilled in the art that the current invention is equally applied to area sensors as well. Optical system 302 focuses the reflected light onto the photo-detectors in the image sensor 304. Each photo-detector converts the incident light to an electronic signal proportionally representing the intensity of the reflected light. These electronic signals are then transferred (read out) to a circuitry that is discussed in detail in FIG. 4.

Before each scan, photo-detectors in image sensor 304 is covered by what is called a mask, not shown in the figure, in Material Physics so that each of the photo-detectors in sensor 304 is shielded from light from light source 300. Meanwhile electronic signal in each photo-detector is cleared to zero. When the light integration process starts, i.e. image sensor 304 is exposed to the scanning object, the mask is cleared so that each photo-detector in sensor array 304 starts sensing and integrating the incident photons from light source 300. Each photo-detector accumulates the incident photons thereon and produces an electronic signal that is typically proportional to the total accumulated photon energy. At the end of the light integration process, each of the photo-detectors in image sensor 304 is covered again by the mask so that photo-detectors cease accumulating more photons.

Figure 3B:
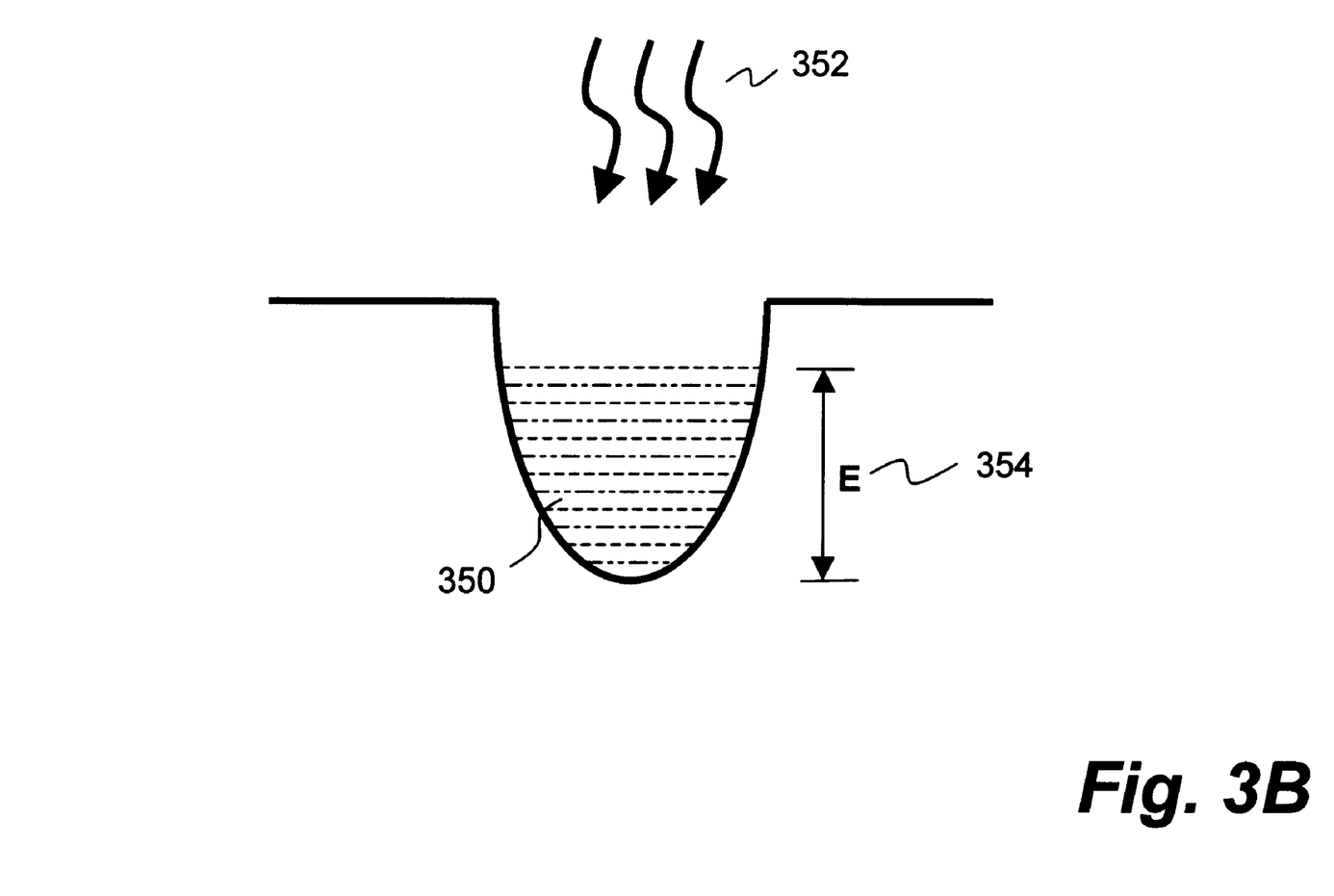
FIG. 3B depicts a pictorial view of a working photo-detector viewed as a well to illustrate how the light integration process works.

FIG. 3B shows a pictorial diagram to illustrate the light integration process for an individual photo-detector. A photo-detector may be viewed like a well 350. Well 350 captures incident photons from light flux 352 and converts the photon energy to electrons (electronic signal) 354. Electronic signal 354 increases in proportion to the total accumulated photon energy in well 350. As this picture shows, the stronger light flux 352 is, the faster the incident photons from light flux 352 are accumulated. In order to decrease the time interval for light integration process and increase the scanning speed, it is better to use a strong light source.

Returning to FIG. 3A, it can be now appreciated why a cold cathode fluorescent lamp 314 is inventively used in a sensing module. Because of the high intensity provided by a fluorescent lamp, the light integration process can be significantly improved. Moreover, the fluorescent lamp is used along with other colored LEDs to reduce the light integration process as further described below.

Distinctly apart from any existing illumination techniques in scanners, blue cold cathode fluorescent lamp 314 is kept on all the time while red LED 310 and green LED 312 are controlled to be on accordingly. To be more specific, when red LED 310 and green LED 312 are both off, a signal resulting from the illumination of blue cold cathode fluorescent lamp 314 is output and meanwhile a copy thereof is buffered. When red LED 310 is turned on with blue cold cathode fluorescent lamp 314, a signal resulting from the mixed illumination is produced, the mixed signal is further processed to get a signal equivalent to being illuminated by red LED 310. Similarly, when green LED 312 is turned on with blue cold cathode fluorescent lamp 314, a signal resulting from the mixed illumination is produced, the mixed signal is further processed to get a signal equivalent to being illuminated by green LED 312.

Figure 4:
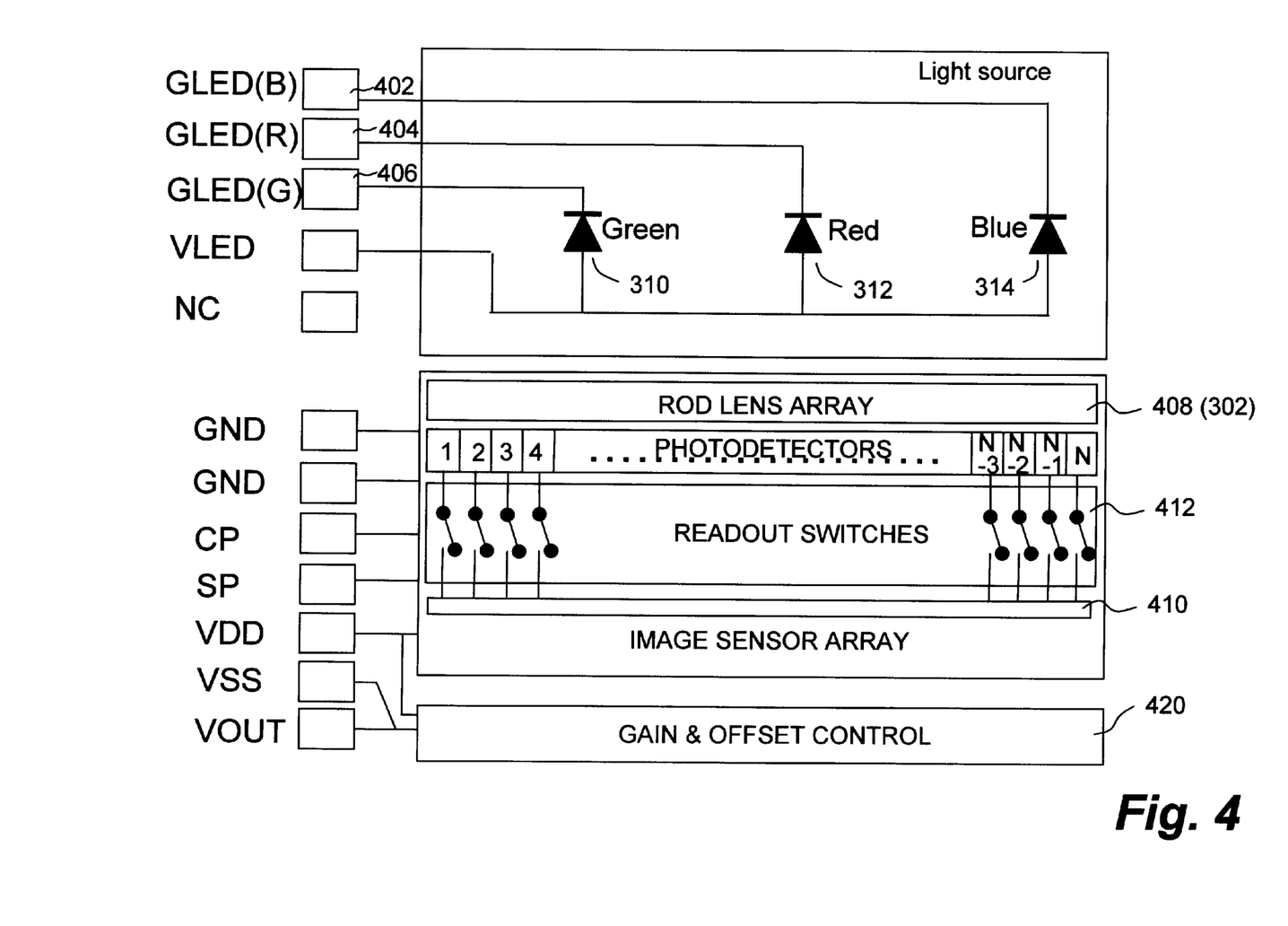
FIG. 4 shows the internal functional diagram of a sensing module according to one embodiment of the present invention.

To further understand the principles of the present invention, FIG. 4 shows the internal functional diagram of sensing module 200 according to one embodiment of the present invention. Hybrid light source 300 comprises a red LED 310 and a green LED 312 and a blue cold cathode fluorescent lamp 314, each controlled individually by an "ON" signal at respective connectors 402, 404, and 406. As described above, blue cold cathode fluorescent lamp 314 is turned on upon a scanning object is ready to be scanned and kept on during the entire scanning process while red LED 310 and a green LED 312 are turned on alternatively as described below, wherein three intensity images, representing the mixed red $I_{red+blue}$, mixed green $I_{green+blue}$ and pure blue $I_{blue}$ components (signals or images) of the scanning object are so generated. It is noted that $I_{red+blue}$ and $I_{green+blue}$ are not the traditional red component $I_{red}$ and green component $I_{green}$, respectively, resulting from only the red and green illumination, they are now mixed red and mixed green components, respectively, resulting from red+blue and green+blue illumination. To recover the traditional red and green components, a circuitry or a process implemented in an application performs the following data manipulation:

$$I_{red} = I_{red+blue} - I_{blue} \quad (1)$$

$$I_{green} = I_{green+blue} - I_{blue} \quad (2)$$

For monochrome scanning, only one of the LED diodes, preferably the green one, is turned on such that only one intensity $I_{green}$ is generated.

The rod lens array 408 collects the reflected light from the scanning object and focuses it onto the image sensor 120 underneath. The image sensor 120 comprises, for example, N photodetectors. Each of the photodetectors collects light cast thereon during each integration process and generates a pixel signal. Upon the completion of the integration process, the pixel signals, each respectively generated by one of the photodetectors, are sequentially readout to the video bus 410 as a scanning signal via the readout switch array 412. The switch array 412 comprises the same number of the readout switches as the number of the photodetectors in the image array 120. It is understood to those skilled in the art that each of the readout switches may be implemented by a diode that becomes "On" or "passing through" when a proper voltage is applied across. As shown in the figure, the scanning signal is coupled to a gain & offset control circuit 420. The scanning signal is processed, including amplified and offset, in gain & offset control circuit 420 with respect to a desired adjustment. It is understood to those skilled in the art that processes (1) and (2) could be fulfilled in gain & offset control circuit 420 by using a memory to buffer $I_{blue}$ and an adder circuit to perform the respective subtraction when $I_{red+blue}$ or $I_{green+blue}$ is, respectively, read out, whereby Vout is maintained to output the traditional red, green and blue components.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. An improved scanning mechanism for accelerating light integration process in image sensing systems, said scanning mechanism comprises:
    a hybrid light source comprising a high intensity colored light source, a first colored light source and a second colored light source;
    an image sensor producing a high intensity image of a scanning object illuminated only by said high intensity colored light source in said hybrid light source, wherein said image sensor is a single-line sensor sensitive to all visible colors;
    a memory buffering said high intensity image;
    said image sensor producing a first image of said scanning object when said scanning object is illuminated by both of said high intensity colored light source and said first colored light source; and said image sensor further producing a second image of said scanning object when said scanning object is illuminated by both of said high intensity colored light source and said second colored light source, and
    a circuitry producing a color image of said scanning object said color image comprising said high intensity image, a first resulting image and a second resulting image, wherein said first resulting image is produced from said high intensity image in said memory with said first image and said second resulting image is produced from said high intensity image in said memory with said second image.

2. The improve d scanning mechanism as recited in claim 1, wherein said circuitry comprises:
    a first subtract circuit subtracting said high intensity image in said memory from said first image to produce said first resulting image; and
    a second subtract circuit subtracting said high intensity image in said memory from said second image to produce said second resulting image.

3. The improved scanning mechanism as recited in claim 1, wherein said high intensity colored light source, said first colored light source and said second colored light produce three respective lights with three distinct colors, said distinct colors forming a fundamental tricolor to reproduce all colors.

4. The improved scanning mechanism as recited in claim 3,
    wherein said high intensity colored light source produces blue color light;
    wherein said first colored light source produces red color light; and
    wherein said second colored light produces green color light.

5. The improved scanning mechanism as recited in claim 4,
    wherein said high intensity colored light source is cold cathode fluorescent blue lamp producing said blue color light;
    wherein said first colored light source is a red LED producing said red color light; and
    wherein said second colored light source is a green LED producing said green color light.

6. The improved scanning mechanism as recited in claim 5,
    wherein said first resulting image is a red image; and
    wherein said second resulting image is a green image.

7. An improved scanning mechanism for accelerating light integration proces s in image sensing systems, said scanning mechanism comprising:
    a first LED producing a first light of a first color;
    a second LED producing a second light of a second color;
    a high intensity lamp producing a third light of a third color; said first color, said second color and said third color forming a fundamental tricolor capable of reproducing all colors;
    an image sensor; said image sensor being a single-line sensor sensitive to all visible colors and producing a lamp signal of a scanning object when said high intensity lamp is on; said image sensor producing a first signal of said scanning object when both said first LED and said high intensity lamp are on; said image sensor further producing a second signal of said scanning object when both said second LED and said high intensity lamp are on;
    a memory buffering said lamp signal; and
    a circuitry coupled to said image sensor and said memory; said circuitry producing a color signal comprising said lamp signal, a first resulting signal and a second resulting signal, wherein said first resulting signal is said lamp signal subtracted by said first signal and said second resulting signal is said lamp signal subtracted by said second signal.

8. The improved scanning mechanism as recited in claim 7;
    wherein said first color is red;
    wherein said second color is green; and
    wherein said third color is blue.

9. The improved scanning mechanism as recited in claim 8, wherein said circuitry is a subtract circuit producing a difference between a first input and a second input, said first input receiving said lamp signal from said memory and said second input receiving one of said first signal and said second signal.

10. The improved scanning mechanism as recited in claim 9, wherein said difference is a red signal when said first input receives said lamp signal from said memory and said second input receives said first signal from said image sensor.

11. The improved scanning mechanism as recited in claim 10, wherein said difference is a green signal when said first input receives said lamp signal from said memory and said second input receives said second signal from said image sensor.

12. An improved scanning mechanism for accelerating light integration process in image sensing systems, said scanning mechanism comprising:

a red LED;

a green LED;

a cold cathode fluorescent blue lamp; and an image sensor; said image sensor being a single-line sensor sensitive to all visible colors and producing a blue signal of a scanning object when said cold cathode fluorescent blue lamp is on; said image sensor producing a first signal of said scanning object when said red LED and said cold cathode fluorescent blue lamp are both on; said image sensor further producing a second signal of said scanning object when said green LED and said cold cathode fluorescent blue lamp are both on;

a memory buffering said blue signal; and a circuitry coupled to said image sensor and said memory; said circuitry producing a red signal by subtracting said blue signal from said first signal; said circuitry producing a green signal by subtracting said blue signal from said second signal.

13. The scanning mechanism as recited in claim 12, further comprising:

a memory buffering said blue signal; and a circuitry coupled to said image sensor and said memory; said circuitry producing a red signal when said blue signal is subtracted from said first signal; said circuitry producing a green signal when said blue signal is subtracted from said second signal.

* * * * *